US006988119B2

(12) United States Patent
Hoskote et al.

(10) Patent No.: US 6,988,119 B2
(45) Date of Patent: Jan. 17, 2006

(54) FAST SINGLE PRECISION FLOATING POINT ACCUMULATOR USING BASE 32 SYSTEM

(75) Inventors: Yatin Hoskote, Portland, OR (US); Sriram R Vangai, Hillsboro, OR (US); Jason M Howard, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 09/895,526

(22) Filed: Jun. 29, 2001

(65) Prior Publication Data

US 2003/0028572 A1    Feb. 6, 2003

(51) Int. Cl.
G06F 7/42    (2006.01)
(52) U.S. Cl. .................................... 708/505
(58) Field of Classification Search ............... 708/505, 708/204
See application file for complete search history.

(56) References Cited

U.S. PATENT DOCUMENTS

| 4,994,996 | A | * | 2/1991 | Fossum et al. | ............. | 708/505 |
| 5,687,106 | A | * | 11/1997 | Schwarz et al. | ............ | 708/204 |
| 5,889,980 | A | * | 3/1999 | Smith, Jr. | ................... | 708/204 |
| 2002/0095451 | A1 | * | 7/2002 | Krygowski et al. | ......... | 708/204 |

OTHER PUBLICATIONS

A. Beaumont-Smith, et al., "Reduced Latency IEEE Floating-Point Standard Adder Architectures" IEEE, 1999.

Erdem Hokenek, et al., "Second-Generation RISC Floating Point with Multiply-Add Fused", IEEE Journal of Solid-State Circuits, vol. 25, No. 5, Oct. 1990, pp. 1207-1213.

Fayez Elguibaly, "A Fast Parallel Multiplier-Accumulator Using the Modified Booth Algorithm", IEEE Transactions on Circuits and Systems—II: Analog and Digital Signal Processing, vol. 47, No. 9, Sep. 2000, pp 902-908.

G. Panneerselvam and B. nowrouzian, "Multiply-Add Fused RISC Architectures for DSP Applications", IEEE Pac Rim '93, pp 108-111.

Zhen Luo and Margaret Martonosi, "Accelerating Pipelined Integer and Floating-Point Accumulations in Configurable Hardware with Delayed Addition Techniques" IEEE Transactions on Computers, vol. 49, No. 3, Mar. 2000, pp 208-218.

* cited by examiner

*Primary Examiner*—Tan V. Mai
(74) *Attorney, Agent, or Firm*—Kenyon & Kenyon

(57) ABSTRACT

The proposed fast single precision floating point accumulator of the present invention uses base 32 computation in an attempt to completely remove the need for a costly 8-bit subtractor in the exponent path as is commonly found in conventional designs. It also replaces the expensive variable shifter in the mantissa path with a constant shifter which significantly reduces the cost of the present invention relative to earlier floating point accumulators. The variable shifter required for base 2 to base 32 conversion has been moved outside the accumulator loop. This approach allows comparison of the two input exponents using a comparator. The mantissas are shifted by constant amount to bring them into partial alignment. They are then added or the appropriate mantissa is chosen as the result. The input stream to the accumulator does not need to be cumulative.

28 Claims, 5 Drawing Sheets

FAST SINGLE PRECISION FLOATING POINT ACCUMULATOR USING BASE 32 SYSTEM

FIELD OF THE INVENTION

The present invention pertains to a robust single precision floating-point accumulator that significantly reduces the control logic required to perform addition, thereby increasing the speed at which fast accumulation can be achieved.

BACKGROUND OF THE INVENTION

In general-purpose microprocessors and DSP applications that utilize FIR filters, the summation $\Sigma a_1 b_i$ often must be calculated where i=0 to n−1 and where $a_I$ and $b_i$ are both single precision floating point numbers. Such calculations often demand the use of fast floating point multiply accumulate units (FMAC). FMAC units essentially multiply two numbers and accumulate the products to give the final result. In designing FMACs, designers have attempted to improve the performance of the main components of the FMACs—the multiplier and the accumulator—by increasing the speed at which these units operate and by reducing the cost to implement these components. Prior implementations of FMACs typically have required placement of expensive variable shifters in the circuit path or circuit "loop". The circuit "loop" implements a sequence of actions (such as shifting mantissa bits) in order to perform mantissa addition. Prior single precision FMAC implementations typically have required 8-bit subtractors in the exponent path (the exponent path is responsible for computing the result exponent. Floating-point accumulation involves addition and a variety of other steps, including exponent alignment, addition of two mantissa(s), normalization (or shifting) of the resulting sum, and rounding of the sum. There exists a need for a FMAC architecture and algorithm that can achieve faster floating-point accumulation when compared to previous implementations for a given precision level. There also exists a need for FMAC implementations that utilize lower cost components than previous implementations. The present invention includes a new architecture and algorithm which enable much faster floating-point accumulation operations than is possible in prior implementations.

DETAILED DESCRIPTION OF THE INVENTION

The proposed fast single precision floating point accumulator of the present invention uses base 32 computation in an attempt to completely remove the need for a costly 8-bit subtractor in the exponent path as is commonly found in conventional designs. It also replaces the expensive variable shifter in the mantissa path with a constant shifter which significantly reduces the cost of the present invention relative to floating point accumulators in the prior art. The variable shifter required for base 2 to base 32 conversion (or conversion into another base system) is moved outside the accumulator loop (which includes the exponent and mantissa loops). Some methods of accumulation use base 32 carry save format and perform accumulation outside the accumulator loop itself, but such methods cannot perform partial normalization of the feedback mantissa as does the present invention. Also, such methods require commutativity of the inputs transmitted to the accumulator. Also such methods handle overflow in an expensive and imprecise manner. The approach of the present invention does comparison of the two input exponents using a 3 bit comparator. A three bit comparator is faster than typical 8 bit subtractors used in the prior art. The comparator generates "greater than", "equal" and "less than" outputs. These signals control multiplexers so that the proper exponents and mantissas are selected and transmitted within the accumulator loop. In order to increase the speed of the addition process, addition is performed using a compressor that receives two numbers in carry save format and compresses the numbers into a sum that is in carry save format (the sum has two components). The components of the sum expressed in carry save format are eventually added to obtain the result in floating point format. This step is performed outside the accumulator loop.

Figure 1:
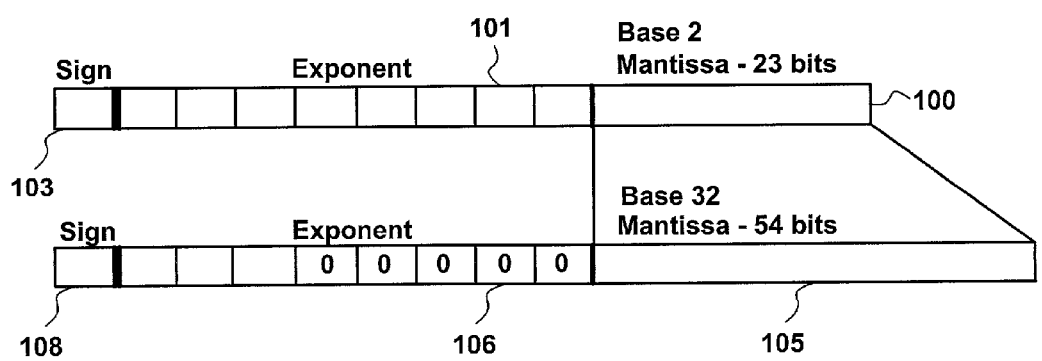
FIG. 1 illustrates components of a floating point base 2 number and base 32 number.

The three components of a single precision floating point number in base 2 and in base 32 formats are shown in FIG. 1. The mantissa bits 100 of the base 2 floating point number are shown in the right-most field. The exponent bits 101 of the base 2 floating point number are shown in the central field of the base 2 representation, and the sign bit 103 is shown in the left-most field. Similarly, the mantissa field (105), exponent field (106) and sign field (108) of the base 2 floating point number when converted into base 32 notation are shown in FIG. 1. The best mode of the invention involves accumulation in base 32 notation, but the invention is by no means limited to accumulation in base 32 format.

Figure 2:
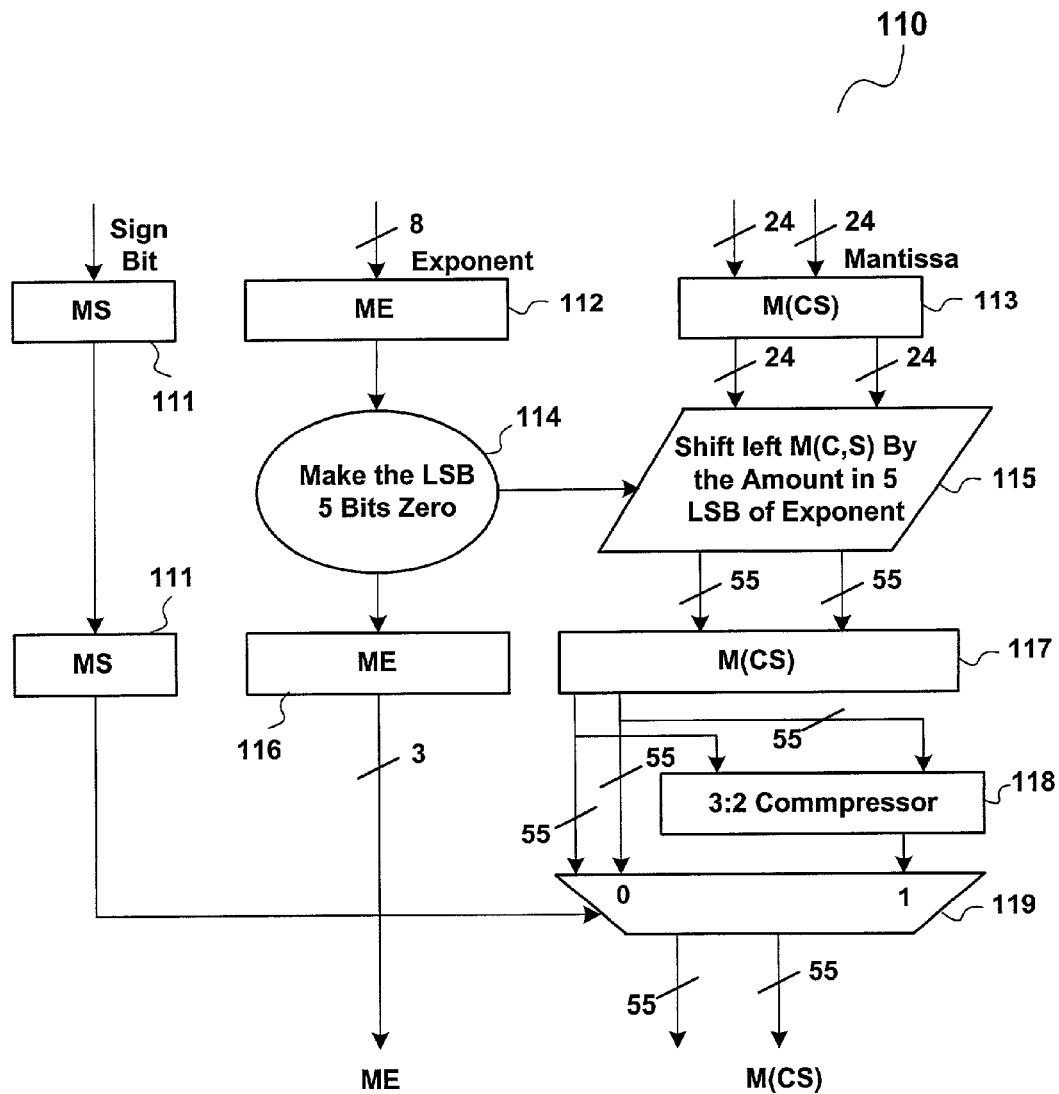
FIG. 2 illustrates conversion of a base 2 floating point number into base 32 number prior to processing by the accumulator.

The procedure whereby base 2 floating point numbers in carry save format may be converted into 2's complement floating point numbers in base 32 carry save format is shown in FIG. 2. The mantissa sign bit 111 is used as a control signal to select the proper 2's complement format numeral that should be transmitted from multiplexer 119. The eight-bit exponent 112 is converted into a three bit exponent by conversion of the 5 least significant bits of the eight bit exponent stream into "zero" bits. The three bit exponent stream 116 is transmitted to the register 200 in the exponent loop circuit depicted in FIG. 3.

The 24 bit mantissa in base 2 format is shifted left by an amount equal to the value represented by the 5 least significant bits of the exponent 112 which are converted to bits with "zero" values. A 55 bit stream 117 representing the mantissa is then transmitted to a 3:2 compressor 118 which converts the stream into 2's complement format by converting all ones to zeroes and zeroes to ones and adding one to the stream. The converted and non-converted version of the mantissas are transmitted to multiplexer 119. The mantissa transmitted from the 3:2 compressor is selected if the mantissa sign bit is 111 is a "1", indicating a negative floating point number. The non-converted version is transmitted from multiplexer 119 if the mantissa sign bit 111 is a "0", indicating a positive floating point number. Typically, accumulation will be performed in base 32 notation, but the invention is by no means limited to accumulation in the 32 base format.

Figure 3:
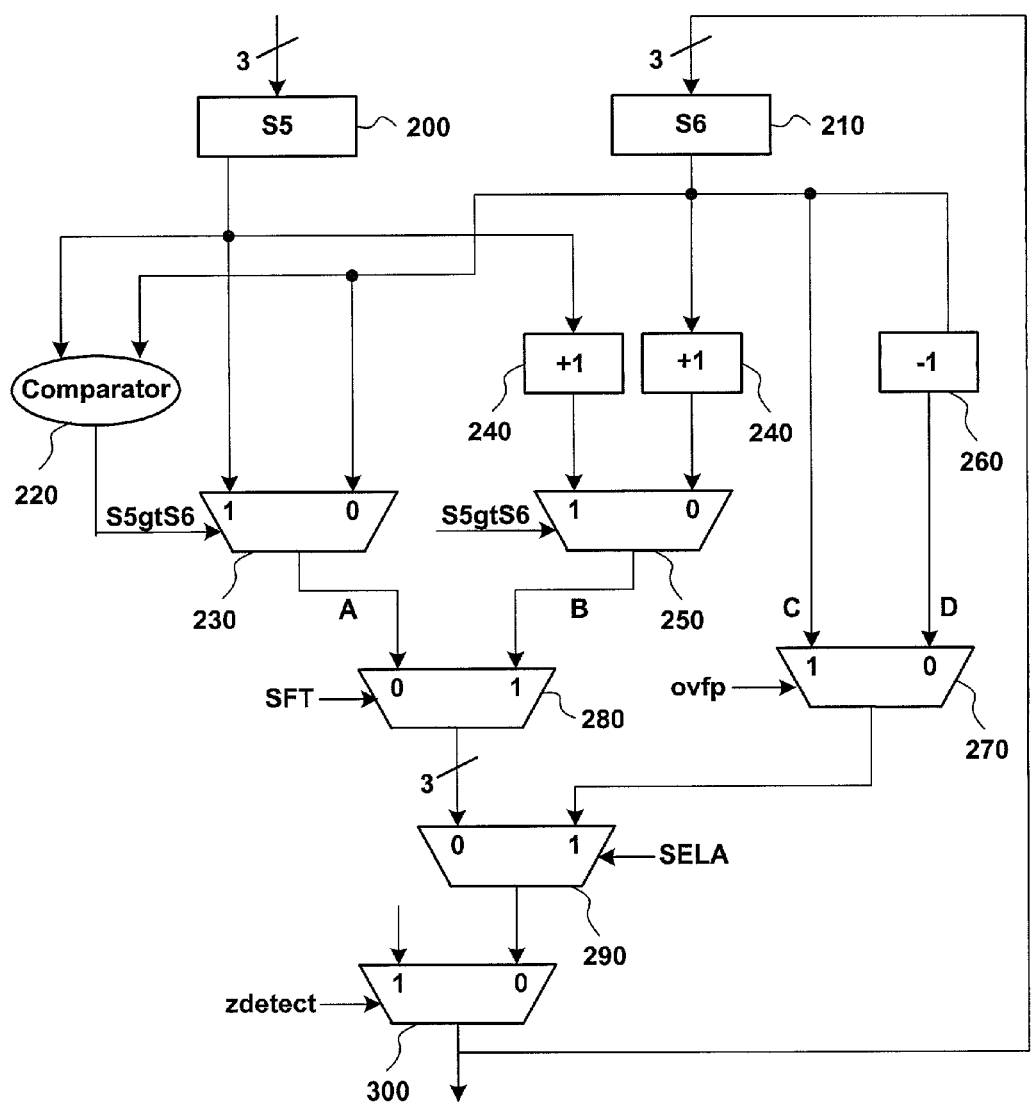
FIG. 3 shows a diagram of the circuit components that calculate the exponent of the accumulation of floating point numbers in the present invention.

FIG. 3 shows a diagram of the part of the circuit that computes result exponents. There is a register 200 that stores some number of the most significant bits of one of the exponents of one of the input operands and a second register 210 that stores some number of the most significant bits of the exponent of the feedback operand. In a typical embodiment of the present invention, registers 200 and 210 will store the most significant three bits of each exponent. Register 210 functions as a "feedback exponent register" because it receives exponent values that have been processed in the exponent loop (the exponent transmitted from multiplexer 300). The feedback register 210 may repeatedly receive exponent values transmitted from multiplexer 300. There is also a comparator 220 that compares the values represented by the bits stored in registers 200 and 210 and produces a control signal "S5gtS6" that is transmitted to multiplexers 230 and 250. The control signal of multiplexer 230 selects the larger of the two values stored in the registers 200 and 210. The control signal of multiplexer 230 is also used to select the larger of the two values stored in registers 200 and 210 when each value is augmented by 1. The two register values are augmented by 1 by the adding devices 240. These two selected values are transmitted by multiplexers 230 and 250 to multiplexer 280.

Multiplexer 280 receives the values transmitted by multiplexers 230 and 250 and transmits the larger of the values stored in registers 200 and 210 unless mantissa overflow occurs in the mantissa loop, meaning that the number of bits in the mantissa sum will soon exceed the number of mantissa bits that can be supported by the logic circuitry of the present invention. The number of bits that can be supported the logic circuitry of the present invention is established by the designer. In the figures, this number of bits is 55. The control signal for multiplexer 280 selects the augmented value for transmission only if the boolean expression (ovf AND ((S5=S6+1) OR (S6=S5+1) OR S5=S6)) is true. This condition expresses if mantissa overflow occurs. The boolean expression in the previous sentence is true and the augmented value is transmitted from multiplexer 280 only if ovf=1 (indicating mantissa overflow) and the exponent bits in registers 200 and 210 differ by 1 or are equal.

The output signal from multiplexer 280 is transmitted to multiplexer 290 which has a control signal labeled "SELA". The value stored in register 210 is transmitted to multiplexer 270. Also, the value stored in register 210 is reduced by 1 by device 260 and is transmitted to multiplexer 270. The value transmitted from multiplexer 280 as well as the value transmitted from multiplexer 270 are received by multiplexer 290.

Path C or path D is selected when the control signal for multiplexer 290 is high. The SELA control signal indicates whether the feedback exponent 210 is greater than the input exponent 200 by one or by two, and if LZAgt31 signal is true. The LZAgt31 signal, if true, indicates a significant number of leading zeros (or ones if negative) in the feedback mantissa and a need to re-align the mantissas.

Figure 4:
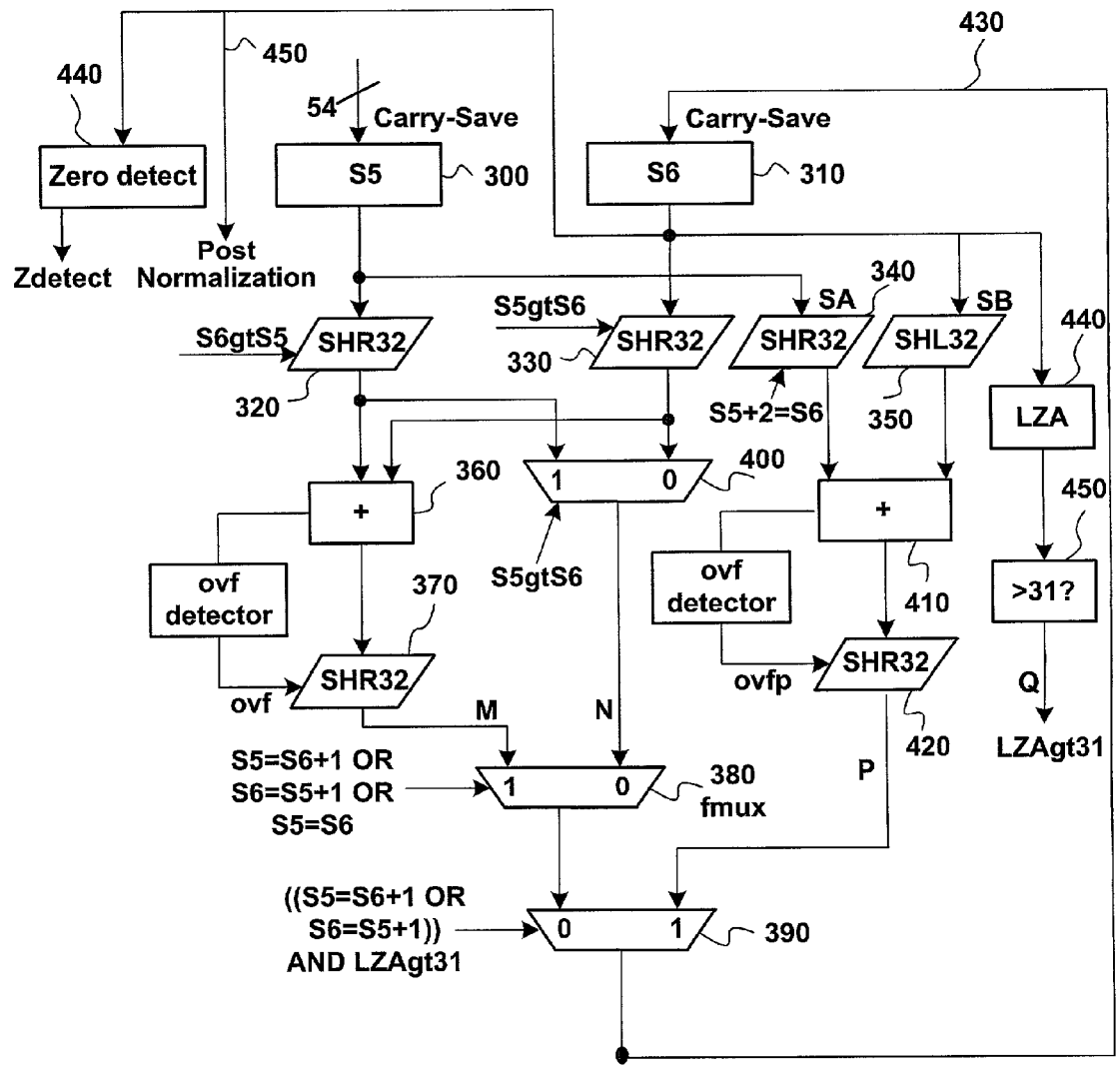
FIG. 4 shows a diagram of the circuit components that calculate the mantissa of the accumulation of floating point numbers in the present invention.

The mantissa loop is shown in FIG. 4. Addition is performed with a compressor that receives two floating point numbers expressed in carry save format, and transmits the sum in carry save format. The components of the carry save format are added outside the accumulator "loop". Typically, a 4-2 compressor will be used to perform addition in the present invention, but the invention is by no means limited to the use of such a compressor and may use other devices to perform addition. The result expressed in base 32 format is shifted right to convert the number back into base 2 single precision floating-point representation by the post normalization circuitry.

A key simplification of the mantissa loop of the present invention over one found in previous implementation is the replacement of a expensive high-fanin variable shifter in the mantissa circuit loop of the present invention with constant shifters 320,330,340,350. (A "constant" shifter in this context typically has one logic level and a variable shifter typically has a number of logic levels roughly dependent on the number of bits that must be shifted.) This constant shifter may be implemented using a simple multiplexer. The mantissa stored in register 300 is transmitted to shifters 320 and 340, which shift mantissa bits to the right. Similarly, the mantissa stored in register 310 is transmitted to shifters 330 and 350. Register 310 might be labeled a "feedback" register because it receives the mantissa sum transmitted from one of the last processing stages of the mantissa loop (multiplexer 390). The feedback register 310 may repeatedly receive mantissa values transmitted from multiplexer 390. If S5gtS6 is true (meaning exponent S5 is greater than exponent S6), then S6 mantissa is shifted right by 32 bits by shifter 330. On the other hand, if S6gtS5 is true (meaning exponent S6 is greater than exponent S5), then S5 mantissa is shifted right by shifter 320. In the case in which the base 32 system is the base system in which accumulation is performed in the present invention, shift amounts are in multiples of 32 bits. Although the base 32 system will be useful for many applications of the present invention, the invention is by no means limited to implementation in base 32 format.

Once the two floating point numbers have been converted to base 32 format, an exponent comparator checks the two input exponents to see if they are equal or if they differ by one. If the two input exponents are equal or differ by one then the two exponents are close enough that their corresponding mantissas can be added using a 4-2 compressor block. If this condition is true, the multiplexer 380 (fmux) selects the sum produced by the 4-2 compressor 360 as the mantissa result (path M). Along the path labeled "M", outputs from shifter 320 and 330 are transmitted to the 4-2 compressor 360, where they are added. Shifter 370 shifts the result to the right by 32 if overflow has occurred. Using 4-2 compressor blocks to implement this portion of the circuit of present invention as opposed to adders results in significant speed improvements when the speed achieved is compared to that achieved in the other types of adders. These improvements are due to the absence of carry ripple. In addition, the latency through the 4-2 compressor 360 is independent of data path width.

If the mantissa with the larger exponent stored in either register 300 or 310 is selected as the final mantissa result by the control signal of the fmux 380 (path "N"), then the compressor 360 will have been bypassed. If the two exponents of the floating point numbers are not equal and if they do not differ by one, then they must differ by at least 2. In the base 32 system, the 4-2 compressor ("adder") 360 is bypassed in the "N" path because the mantissa of the floating point number of smaller magnitude must be shifted right to such an extent (at least 64 bits) that it would be appropriate for the adder to interpret that shifted mantissa as being equal to zero. As a result, addition of the smaller mantissa to the larger mantissa is not required in this case. When the exponent values stored in registers 200 and 210 differ by more than 1, the mantissa of the floating point number with the larger exponent is chosen as the final mantissa result.

The circuit path labeled "P" includes shifters 340 and 350, compressor 410 and shifter 420. Shifter 350 is necessary because of a need for partial normalization of the feedback mantissa inside the accumulation loop. Without the "P" path logic, the feedback mantissa traveling along the feedback line 430 to register 310 during the accumulation process might not be properly aligned to the input mantissa in register 300. The feedback mantissa stored in register 310 might contain a significant number of leading zeroes (or leading ones if the feedback mantissa is negative). Typically, the feedback mantissa contains a significant number of leading zeroes when mantissas that are approximately equal in magnitude and opposite in sign are added. In such a case the feedback mantissa would need to be normalized by the left shifter 350. The input mantissa stored in register 300 is also shifted to the right by 32 bits in order to effect mantissa alignment if the input exponent is less than the feedback exponent by 2. Otherwise, the next execution of the accumulation loop may cause the input mantissa to be incorrectly shifted out of the register in which it is contained, resulting in fatal precision errors in the mantissa sum transmitted from multiplexer 390. A fatal precision error is a very large difference between an expected value and an actual value. The shifts performed by shifters 340 and 350 are "constant" shifts in the sense that the magnitude of the shift is always equal to base of the numbering system in which addition is performed, which is typically base 32. The mantissa(s) are then added using a 4-2 compressor block. Signal "ovfp" is "high" if overflow occurs as a result of the addition performed by the compressor 410.

The Leading Zero Anticipator (LZA) output signal LZAgt31 (path Q) indicates "true" if there are more than 31 leading zeros (or ones if negative) in the feedback mantissa stored in register 310. The bit stream transmitted along path "P" is selected by control signal 460 and is transmitted from multiplexer 390 if the 3 bit feedback exponent is greater than the input exponent by one or by two. This check is valid only if LZAgt31 signal indicates "true". In this case, the output of the 4-2 compressor 410 (Path "P") is selected as the final mantissa result transmitted from multiplexer 390. The circumstances under which each of the paths "M", "N" or "P" is used to calculate final mantissa sums in the mantissa loop is described in table 1 below.

TABLE 1

| Exponent Values | (S6 > S5 + 2) OR (S5 > S6 + 2 AND LZAgt31 = 0) | (S5 = S6) OR (S5 = S6 + 1) OR (S6 = S5 + 1 AND LZAgt31 = 0) | (S6 = S5 + 1 OR S6 = S5 + 2) AND LZAgt31 = 1 |
|---|---|---|---|
| Mantissa Chosen | Compressor bypass (path "N") | Compressor output (path "M") | Path "P" |

Figure 5:
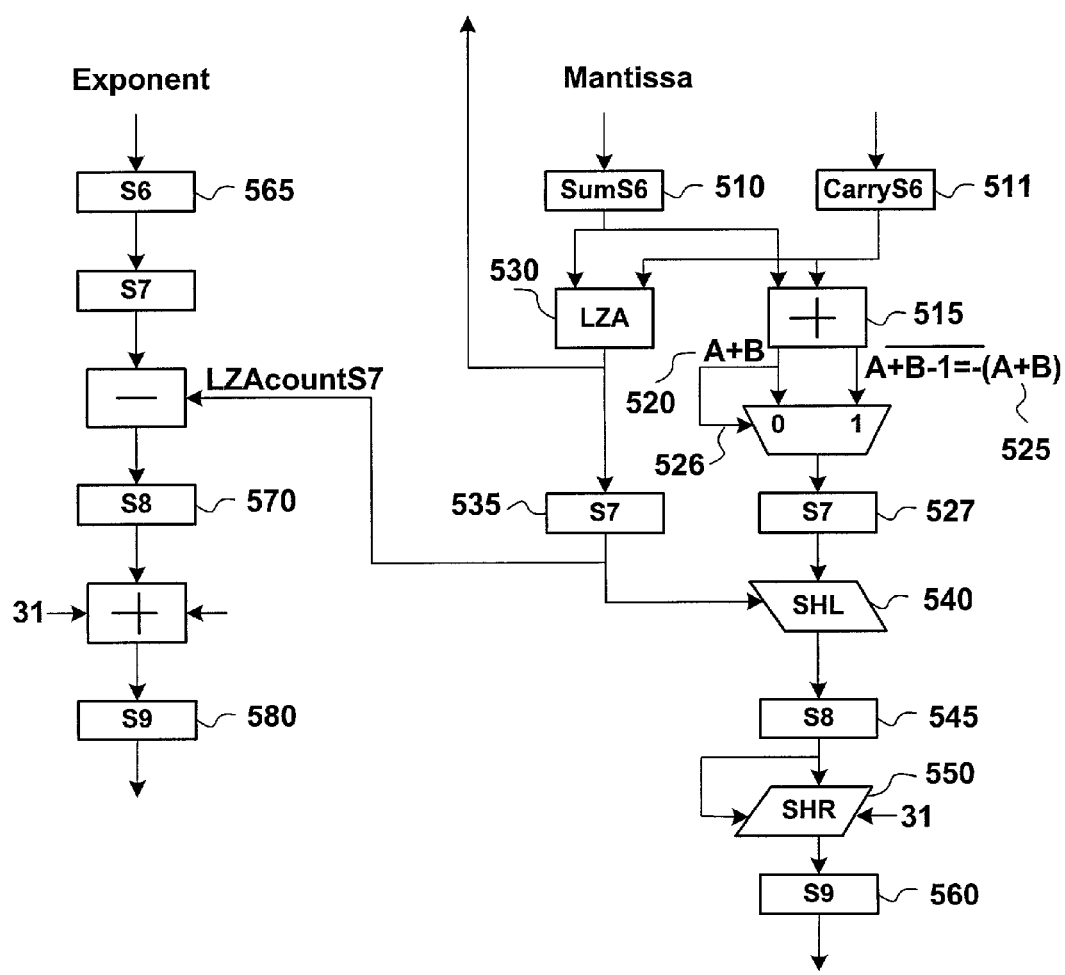
FIG. 5 shows post normalization circuitry that generates the final mantissa result.

Post normalization circuitry is shown in FIG. 5. The two component of the mantissa result 510, 511 produced by accumulation are added in the post normalization block to produce the final result mantissa. A dual adder 515 is used that produces the sum 520 (A+B) and its negative 525 −(A+B) in parallel. The sign bit of the result 526 is used to select the appropriate sum 527. If sign bit is 0, then A+B is chosen. If sign bit is 1 then −(A+B) is chosen. In parallel with the functions performed by the adder 515, an LZA 530 is used to compute the number of leading zeroes or ones. The count of the number of leading zeroes "LZAcountS7" 535 is used to shift the mantissa left. This shift is performed by SHL block 540 and produces the mantissa labeled 545. Then the shifted mantissa is shifted right by 31 bits by the shifter 550 and is reduced in size from 55 bits to 24 bits. This is the final result mantissa 560.

The exponent post normalization path is shown on the left side of FIG. 5. The exponent 565 is decreased by the "LZAcountS7" 535 in order to compensate for the left shift of the mantissa performed by shifter 540. The reduction of exponent 565 produces exponent 570. Exponent 570 is increased by 31 in order to compensate for the right shift of the mantissa performed by element 550, which produces the final exponent result 580 which has been converted back to base 2 format.

The algorithm and architecture of the present invention may be used for implementing high speed and low power single precision floating point adder units or FMACs. It also may be used in future processors and for implementing DSP application-specific architectures. The design enables Intel to continue to introduce new microprocessors operating at higher frequency rates. This design is being used in CRL's Pinnacle prototype chip.

While certain embodiments of the present invention have been described herein, the present invention should not be construed as being restricted to those embodiments. All embodiments and implementations covered by the claims as amended will be embraced by the present invention.

What is claimed is:

1. A floating point accumulator, said accumulator comprising:
    A first circuit network which is designed to convert floating point numbers expressed in base 2 format into floating point numbers expressed in a new base format represented by a whole number;
    A second circuit network which is designed to compare the exponents of two of the converted numbers by comparing some number of most significant bits of the exponents of the two converted numbers, said bits representing exponent values of the two converted numbers;
    A third circuit network which is designed to shift mantissas, add shifted mantissas of the two converted numbers using compressors, choose an accurate result mantissa, and partially normalize feedback mantissas;
    A fourth circuit network designed to convert back to base 2 format both the mantissa and exponent of the final result.

2. The floating point accumulator of claim 1, wherein said floating point numbers are converted into numbers expressed in a new base by shifting the mantissas of each floating point number by a quantity equal to the K least significant bits of the exponents of the floating point numbers and by removing the K least significant bits from the exponents, where K equals the logarithm to the base 2 of the new base.

3. The floating point accumulator of claim 2, wherein said accumulator includes at least two registers, including an exponent register storing a first exponent value and a feedback exponent register that initially stores a second exponent value and that is updated periodically with a feedback exponent value.

4. The floating point accumulator of claim 3, wherein a comparator compares the exponent values each stored in one of the exponent registers and transmits a control signal indicating the larger of the two exponent values.

5. The floating point accumulator of claim 4, wherein a first multiplexer receives said control signal and said exponent values and transmits the larger of the exponent values.

6. The floating point accumulator of claim 5, wherein a plurality of adding devices receive said exponent values, calculate a plurality of augmented values each equal to the sum of one of the values and one and transmit the augmented values.

7. The floating point accumulator of claim 6, wherein a second multiplexer receives said augmented values and said control signal and transmits the larger of the augmented values.

8. The floating point accumulator of claim 7, wherein a third multiplexer receives the augmented value transmitted by the second multiplexer, the value transmitted by the first multiplexer, and an control signal which selects either the value transmitted by the first multiplexer or augmented value transmitted by second multiplexer.

9. The floating point accumulator of claim 8, wherein a fourth multiplexer receives said exponent values, another of said exponent values reduced the whole number amount by a subtracting device, and an overflow control signal which causes the greater of the values received by the fourth multiplexer to be transmitted if a sum of the shifted mantissas of the floating point numbers exceeds the mantissa size supported by said accumulator, otherwise the fourth multiplexer transmits the smaller value it receives.

10. The floating point accumulator of claim 9, wherein a fifth multiplexer receive the value transmitted by the fourth multiplexer, the value transmitted by the third multiplexer, and a control signal, and selects the value transmitted by the fourth multiplexer if the feedback exponent value is greater than first exponent value by one or two and there are more than 31 leading zeros or ones in the feedback mantissa, otherwise the fifth multiplexer transmits the value received from the third multiplexer.

11. The floating point accumulator of claim 10, wherein a sixth multiplexer receives the value transmitted by the fifth multiplexer, the first exponent value, and a control signal that causes the first exponent value to be transmitted from the sixth multiplexer if all bits of a feedback mantissa are zero, otherwise the sixth multiplexer transmits the value transmitted by the fifth multiplexer.

12. The floating point accumulator of claim 11, wherein the values transmitted from the sixth multiplexer are transmitted to the feedback exponent register in a feedback loop and replace the value previously stored in the feedback exponent register during the last execution of the second circuit network.

13. The floating point accumulator of claim 12, wherein a first mantissa is received by and stored in a mantissa register and a second mantissa is received by and stored in a feedback mantissa register that are components of said third circuit network.

14. The floating point accumulator of claim 13, wherein the first mantissa is transmitted to a first shifter and is shifted right by a number of bits equal to the base of the numbering system in which the mantissas are added if the feedback exponent is greater than the first exponent.

15. The floating point accumulator of claim 14, wherein the second mantissa is transmitted to a second shifter and is shifted right by a number of bits equal to the base of the numbering system in which the mantissas are added if the first exponent is greater than the feedback exponent.

16. The floating point accumulator of claim 15, wherein said first mantissa is transmitted to a third shifter and said second mantissa is transmitted to a fourth shifter and said first mantissa is shifted right by the third shifter by a number of bits equal to the base of the numbering system in which the mantissas are added if the first exponent is less than the feedback exponent by two, and said second mantissa is shifted left by a number of bits equal to the base of the numbering system in which the mantissas are added.

17. The floating point accumulator of claim 16, wherein said first and second mantissas are added by a first adding device in the mantissa loop forming a mantissa sum that is shifted right by a number of bits equal to the base of the numbering system in which the mantissas are added if the mantissa sum contains more significant bits than are supported by the accumulator.

18. The floating point accumulator of claim 17, wherein the mantissa sum is transmitted by a selecting multiplexer if the first and second exponents differ by one or if the exponents are equal, and otherwise the mantissa associated with the larger exponent is transmitted by the selecting multiplexer.

19. The floating point accumulator of claim 18, wherein a leading zero anticipator generates a signal that indicates whether the number of leading zeroes or ones contained in the second mantissa is equal or greater than the base of the numbering system in which accumulation is performed and is a portion of the control signal used to control said fifth multiplexer in the second circuit network.

20. The floating point accumulator of claim 19, wherein a second adder in said third circuit adds the shifted values generated by the third and fourth shifters and transmits the calculated sum to a sixth shifter that shifts the sum to the right by the base of the number system in which mantissas are added if a mantissa overflow condition occurs when the mantissa sum is calculated.

21. The floating point accumulator of claim 20, wherein a third multiplexer in the mantissa loop receives the bit stream transmitted by the sixth shifter and the bit stream transmitted by second multiplexer in the mantissa loop and transmits the bit stream received from the sixth shifter if the feedback exponent value is greater than first exponent value by one or two and the number of leading zeroes or ones in the feedback manitssa is equal or greater than the base of the numbering system in which accumulation is performed.

22. The floating point accumulator of claim 21, wherein the base of the number system in which the mantissas and exponents of the floating point numbers are added is at least 32 for single precision format and at least 64 for double precision format.

23. The floating point accumulator of claim 22, further comprises a post normalization circuit wherein components of a mantissa result are added, Shifted to remove leading zeroes, and shifted to convert the mantissas back into a number expressed in base 2 format, and the exponent result is increased or decreased by an amount that converts it back to base 2 format.

24. A method of adding floating point numbers, said method comprising:
Converting, using a first circuit network, the floating point numbers expressed in base 2 format into floating point numbers expressed in a second base format represented by a whole number;
Comparing, using a second circuit network, the exponents of two of the floating point numbers by comparing some number of the most significant bits of the exponents of the two floating point numbers, said bits representing exponent values of the two converted floating point numbers and choosing a correct result exponent;
Shifting and adding mantissas of two of the floating point numbers using one or more compressors and choosing a correct result mantissa using a third circuit network;

Repeating said comparing, shifting and adding multiple times using two of the floating point numbers, wherein one of the floating point numbers consists of a result exponent and result mantissa previously determined;

Converting, using a fourth circuit network, the result mantissa and exponent back to base 2 format.

25. The method of claim 24 further comprises storing an exponent value of a first floating point number in an exponent register and an exponent values of a second floating point number in an exponent feedback register that is updated periodically with a feedback exponent value produced by said comparison of exponent.

26. The method of claim 25, wherein a first mantissa is received by and stored in a mantissa register and a second mantissa is received by and stored in a feedback mantissa register that is updated periodically with a feedback mantissa value produced by said shifting and adding of mantissas.

27. The method claim 26 further comprises a zero detector that detects whether all bits of the feedback mantissa stored in the feedback mantissa register are zero.

28. The method of claim 27 further comprises a post normalization circuit wherein components of a mantissa result are added, shifted to remove leading zeroes, and shifted to convert the mantissas back into numbers expressed in base 2 format, and the exponent result is increased or decreased by an amount that converts it back to base 2 format.

* * * * *

UNITED STATES PATENT AND TRADEMARK OFFICE
CERTIFICATE OF CORRECTION

PATENT NO.        : 6,988,119 B2
APPLICATION NO. : 09/895526
DATED             : January 17, 2006
INVENTOR(S)       : Yatin Hoskote et al.

It is certified that error appears in the above-identified patent and that said Letters Patent is hereby corrected as shown below:

(75) Inventors, line 2: "Vangai" should be --Vangal--

Column 7, line 4: "and one" should be deleted

Column 7, line 18:   "values reduced the whole" should be
                     --values reduces the whole--

Column 7, line 26: "fifth multiplexer receive" should be
                   --fifth multiplexer receives--

Column 8, line 20: "is equal or greater than" should be
                   --is equal to or greater than--

Column 8, line 47: "are added, Shifted to" should be
                   --are added, shifted to--

Column 9, line 9:   "an exponent values" should be
                    --an exponent value--

Signed and Sealed this

Second Day of January, 2007

JON W. DUDAS
*Director of the United States Patent and Trademark Office*